Patented Oct. 3, 1950

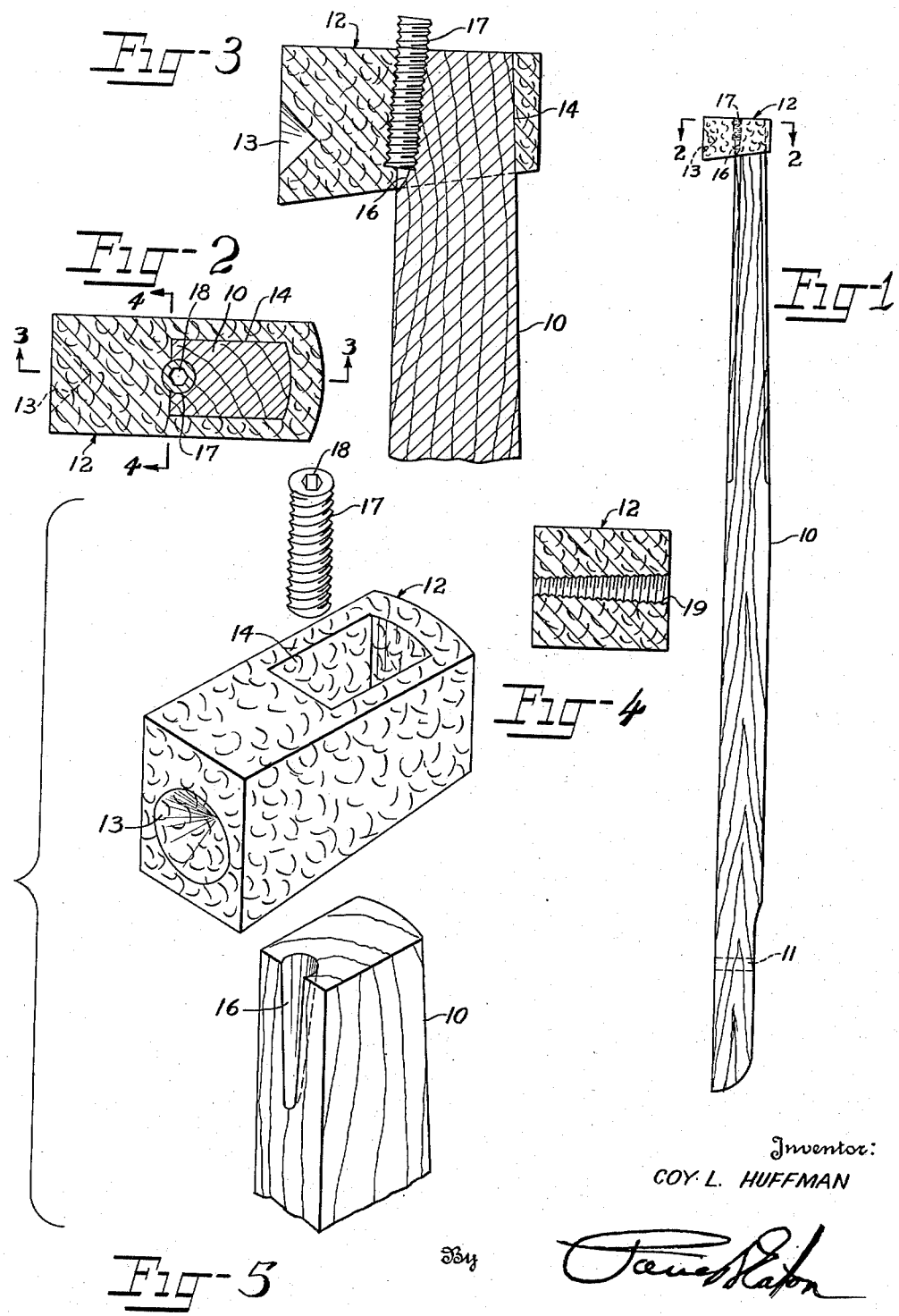

2,524,443

UNITED STATES PATENT OFFICE 2,524,443

PICKER MOUNTING MEANS

Coy L. Huffman, Greenville, N. C.

Application December 18, 1947, Serial No. 792,487

3 Claims. (Cl. 139—159)

This invention relates to an improved means for mounting a picker on a picker stick in a loom.

Heretofore pickers have been mounted on the upper end of a picker stick usually by means of the rear portion of the picker having a hole therethrough and a wood screw is passed through this hole and imbedded in a suitable hole in the back edge of the picker stick for holding the picker in adjusted position relative to the picker stick. It so happens that from time to time it is necessary to adjust the position of the picker with relation to the upper end of the picker stick and minute adjustments cannot be made once a picker is installed due to the fact that the picker has to be moved a substantial amount to where a new hole can be formed in the picker stick far enough away from the previous hole in which the wood screw is mounted in order for the wood screw to be properly imbedded in the picker stick.

It is an object of the present invention to provide means for securely fastening a picker to the upper end of the picker stick in adjusted position and whereby the picker can be adjusted in a different position either up or down the picker stick in minute amounts without in any way affecting the secure adjustment of the same.

It is an object of this invention therefore to provide in the upper front surface of the picker stick a vertically disposed groove and then when the picker is fitted on the picker stick a suitable screw can be threadably mounted in the groove in the picker stick which will cut its own threads and will at the same time become imbedded in the rear portion of the front half of the picker stick, or, if desired, a threaded cavity can be provided in the picker for receiving the screw which securely binds the picker and the picker stick together.

Some of the objects of the invention having been stated, other objects will appear as the description proceeds when taken in connection with the accompanying drawings, in which Figure 1 is an elevation of a picker stick and showing a picker secured thereon by my improved means of securing;

Figure 2 is a sectional plan view taken along the line 2—2 in Figure 1;

Figure 3 is a vertical sectional view taken along the line 3—3 in Figure 2;

Figure 4 is a vertical sectional view taken along the line 4—4 in Figure 2;

Figure 5 is an exploded isometric view of the upper end of the picker stick, the picker and the securing screw before the same are assembled.

Referring more specifically to the drawings, the numeral 10 indicates a conventional picker stick, the lower end of which is adapted to be secured in a conventional manner to a shoe by means of a bolt passing through a hole 11 in the lower end of the picker stick. On the upper end of the picker stick, I mount a conventional picker 12 having a cavity 13 in its front face for receiving the nose of the shuttle and the picker must be adjusted relative to the picker stick so that the nose of the shuttle will coincide with the cavity 13.

The picker has a vertically disposed opening 14 therein for reception of the picker stick 10. Instead of securing the picker to the picker stick by a wood screw penetrating a hole in the back portion of the picker, I provide a downwardly extending and forwardly tapered cavity 16 in the upper front edge of the picker stick and after the picker is mounted on the picker stick to the proper position, I then take a suitable screw 17 having a socket recess 18 for receiving a suitable socket wrench and then the screw 17 is driven home to the position shown in Figure 1 or further downwardly than as is shown in Figure 3 and the screw which is threaded forms female threads in the walls of the groove 16 and also in the rear surface of the front portion of the picker which fits against the front edge of the picker stick.

If desired, instead of mutilating or marring the rear surface of the front portion of the picker which fits against the front edge of the picker stick, I can at the time the picker is made, mold a suitable groove therein having female threads 19 for receiving the front portion of the screw 17 while the screw 17 will cut its own threads in the wooden picker stick 10 or the walls of the groove 16.

It is thus seen that I have provided improved means for adequately securing a picker on the upper end of a picker stick and which securing means will not allow a change of adjustment due to vibrations and blows which are imparted to the picker and picker stick by an incoming shuttle of the loom.

In the drawings and specification there has been set forth a preferred embodiment of the invention, and although specific terms are employed, they are used in a generic and descriptive sense only and not for purposes of limitation, the scope of the invention being defined in the claims.

I claim:

1. In combination a picker stick for looms and a picker mounted on the upper end thereof, the front surface of the upper end of the picker stick having a vertically extending groove therein becoming shallower as it progresses downwardly and a screw having the same diameter throughout its length adapted to be forced downwardly in the vertically extending groove and to engage and cut female threads of gradually increasing depth as the screw is driven home in that portion of the picker fitting against the front portion of the upper end of the picker stick and to also cut threads in the walls of the groove in the picker stick to secure the picker on the picker stick.

2. In a picker stick for looms having a picker mounted on the upper end thereof, the front surface of the upper end of the picker stick having a vertically extending groove therein becoming shallower as it progresses downwardly, and a screw having the same diameter throughout its length adapted to be forced downwardly in said groove to form threads in the walls of said groove and to form female threads of gradually increasing depth as the screw is driven home in that surface of the picker which lies flush against the front edge of the picker stick.

3. In a picker stick for looms having a picker provided with a vertically extending hole and through which the upper end of the picker stick is adapted to be inserted for mounting the picker on the upper end of the picker stick, the upper end of the picker stick having a vertically extending groove in one of its exterior portions becoming shallower as it progresses downwardly and a screw mounted in the vertically extending groove and having the same diameter throughout its length and engaging one of the walls of the vertically extending hole through the picker for securely fastening the picker and the picker stick together, said screw in the course of being driven home, cutting female threads of gradually decreasing depth in the walls of the groove and also cutting female threads of gradually increasing depth in the surface of the picker adjacent thereto.

COY L. HUFFMAN.

REFERENCES CITED

The following references are of record in the file of this patent:

UNITED STATES PATENTS

| Number | Name | Date |
|---|---|---|
| 739,136 | Appleton | Sept. 15, 1903 |
| 2,222,351 | Lewis | Nov. 19, 1940 |

FOREIGN PATENTS

| Number | Country | Date |
|---|---|---|
| 182,579 | Germany | Apr. 2, 1907 |